(12) United States Patent
Ogasawara

(10) Patent No.: US 11,847,735 B2
(45) Date of Patent: Dec. 19, 2023

(54) INFORMATION PROCESSING APPARATUS, INFORMATION PROCESSING METHOD, AND RECORDING MEDIUM

(71) Applicant: CANON KABUSHIKI KAISHA, Tokyo (JP)

(72) Inventor: Taku Ogasawara, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/675,049

(22) Filed: Feb. 18, 2022

(65) Prior Publication Data
US 2022/0277511 A1    Sep. 1, 2022

(30) Foreign Application Priority Data

Feb. 26, 2021 (JP) .................................. 2021-030907

(51) Int. Cl.
G06T 15/20 (2011.01)
G06T 7/50 (2017.01)
G06T 7/70 (2017.01)

(52) U.S. Cl.
CPC ............... *G06T 15/20* (2013.01); *G06T 7/50* (2017.01); *G06T 7/70* (2017.01)

(58) Field of Classification Search
None
See application file for complete search history.

(56) References Cited

U.S. PATENT DOCUMENTS

| 11,244,423 B2 | 2/2022 | Ogasawara |
| 2012/0133638 A1* | 5/2012 | Davison .................. G06T 19/00 345/419 |
| 2015/0130790 A1* | 5/2015 | Vasquez, II ........... G06T 19/006 345/419 |
| 2021/0235014 A1 | 7/2021 | Ogasawara |
| 2021/0266511 A1 | 8/2021 | Ogasawara |
| 2021/0349620 A1 | 11/2021 | Ogasawara |

FOREIGN PATENT DOCUMENTS

| EP | 3509296 A1 | 7/2019 |
| JP | 2017134775 A | 8/2017 |
| KR | 101932133 B1 | 3/2019 |
| WO | 2020007668 A1 | 1/2020 |

OTHER PUBLICATIONS

Craig, Alan B., "Understanding Augmented Reality: Concepts and Applications," In: "Understanding Augmented Reality: Concepts and Applications," Dec. 31, 2013, newnes, XP055947588, ISBN: 978-0-240-82410-9, pp. 41-43.
Extended European Search Report dated Aug. 9, 2022 in corresponding EP Patent Application No. 22158017.8.

* cited by examiner

*Primary Examiner* — Frank S Chen
(74) *Attorney, Agent, or Firm* — Carter, DeLuca & Farrell LLP

(57) ABSTRACT

An information processing apparatus obtains information corresponding to a scene in a virtual viewpoint image to be generated. The information is information based on a captured image including a product generated based on the scene in the virtual viewpoint image. The information processing apparatus outputs, based on the obtained captured image, a virtual viewpoint image of the scene corresponding to the product.

16 Claims, 7 Drawing Sheets

FIG.2A

| OBJECT \ TIME CODE | ... | 16:14:24.041 | 16:14:24.042 | ... | 16:14:25.001 | 16:14:25.002 | ... | 16:14:25.021 | ... |
|---|---|---|---|---|---|---|---|---|---|
| A | ... | Data A100 | Data A101 | ... | Data A120 | Data A121 | ... | Data A141 | ... |
| B | ... | Data B100 | Data B101 | ... | Data B120 | Data B121 | ... | Data B141 | ... |
| ... | ... | ... | ... | ... | ... | ... | ... | ... | ... |
| N | ... | Data N100 | Data N101 | ... | Data N120 | Data N121 | ... | Data N141 | ... |

| ITEM | DATA |
|---|---|
| 3D MODEL | |
| TEXTURE | |
| AVERAGE COORDINATES | |
| BARYCENTRIC COORDINATES | |
| MAXIMUM/MINIMUM COORDINATES | |

220

INFORMATION PROCESSING APPARATUS, INFORMATION PROCESSING METHOD, AND RECORDING MEDIUM

BACKGROUND

Field

The present disclosure relates to an information processing apparatus, an information processing method, and a recording medium.

Description of the Related Art

There is technology for calculating the position, attitude, and the like of a portable terminal such as a smartphone based on an image of a two-dimensional marker captured by the portable terminal and generating a virtual viewpoint image according to the position and attitude thus calculated. This technology is being used in various fields and is being used for, for example, augmented reality (AR) technology. Japanese Patent Laid-Open No. 2017-134775 discloses a technique for correcting a tilt of a virtual viewpoint image caused by, e.g., camera shake during the image capture of a two-dimensional marker.

Meanwhile, in recent years, 3D printers and the like have been used to generate a figure of an actual person or the like based on a 3D model (shape data representing the three-dimensional shape) of an object obtained by image capture or scanning of the person or the like.

SUMMARY

While it is possible to generate a figure of a person or the like based on a certain scene in a virtual viewpoint image, there are demands for knowing more about the figure generated, such as which scene in the original virtual viewpoint image the figure is based on. There are also cases where a certain scene in a virtual viewpoint image is used to generate a new virtual viewpoint image corresponding to a different virtual viewpoint. In this case as well, similarly, there are demands for knowing more about the virtual viewpoint image thus generated.

An information processing apparatus according to one aspect of the present disclosure obtains information corresponding to a scene in a virtual viewpoint image to be generated, the information being information based on a captured image including a product generated based on the scene in the virtual viewpoint image, and outputs, based on the obtained captured image, a virtual viewpoint image of the scene corresponding to the product.

Further features of the present disclosure will become apparent from the following description of exemplary embodiments with reference to the attached drawings.

BRIEF DESCRIPTION OF THE DRAWINGS

FIGS. 2A and 2B are diagrams showing an example of information managed by a database;

DESCRIPTION OF THE EMBODIMENTS

Figure 1A:
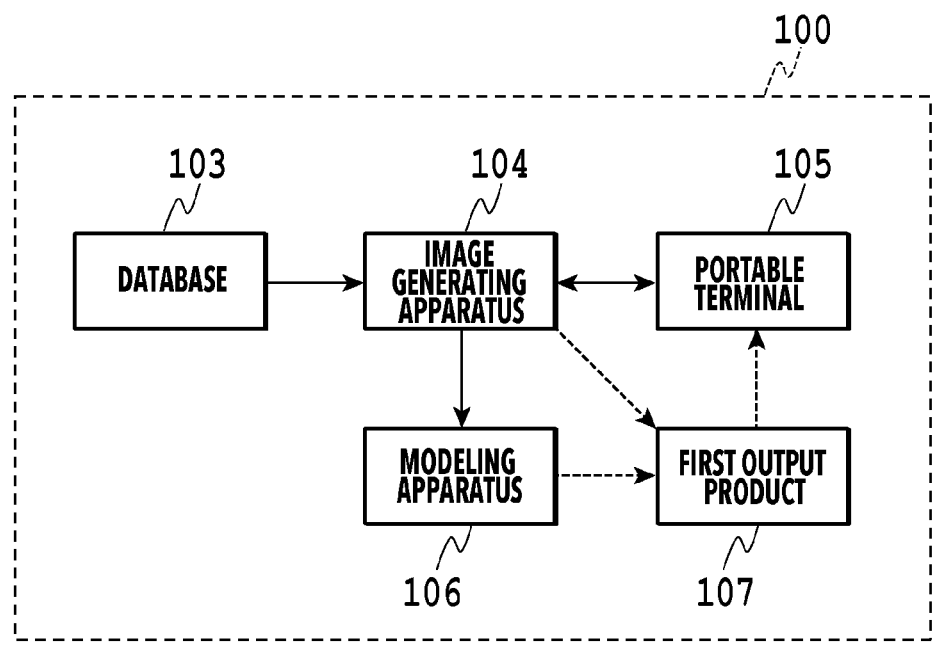
FIGS. 1A and 1B are diagrams showing an example configuration of an information processing system.

Embodiments of the present disclosure are described below with reference to the drawings. Note that the embodiments below are not intended to limit the present disclosure according to the scope of claims, and not all of the combinations of features described in the embodiments are necessarily essential as the solving means of the present disclosure. Also note that the same constituent elements are denoted by the same reference numerals to omit their descriptions.

Embodiment 1

In a mode described in the present embodiment, a description is given of how a captured image of a product generated based on a 3D model which is the same as a 3D model used to generate a virtual viewpoint image is used to either generate a virtual viewpoint image corresponding to the same 3D model as the 3D model used to generate the product or to obtain information related thereto. Note that a virtual viewpoint image is an image generated by an end user and/or an appointed operator or the like operating the position and attitude (orientation) of a camera corresponding to a virtual viewpoint (a virtual camera), and is also called, e.g., a free-viewpoint image or an arbitrary-viewpoint image. A virtual viewpoint image may either be a video or a still image, but in the present embodiment, a case of a video is described as an example. A 3D model is shape data representing the three-dimensional shape of an object.

(System Configuration)

Figure 1B:
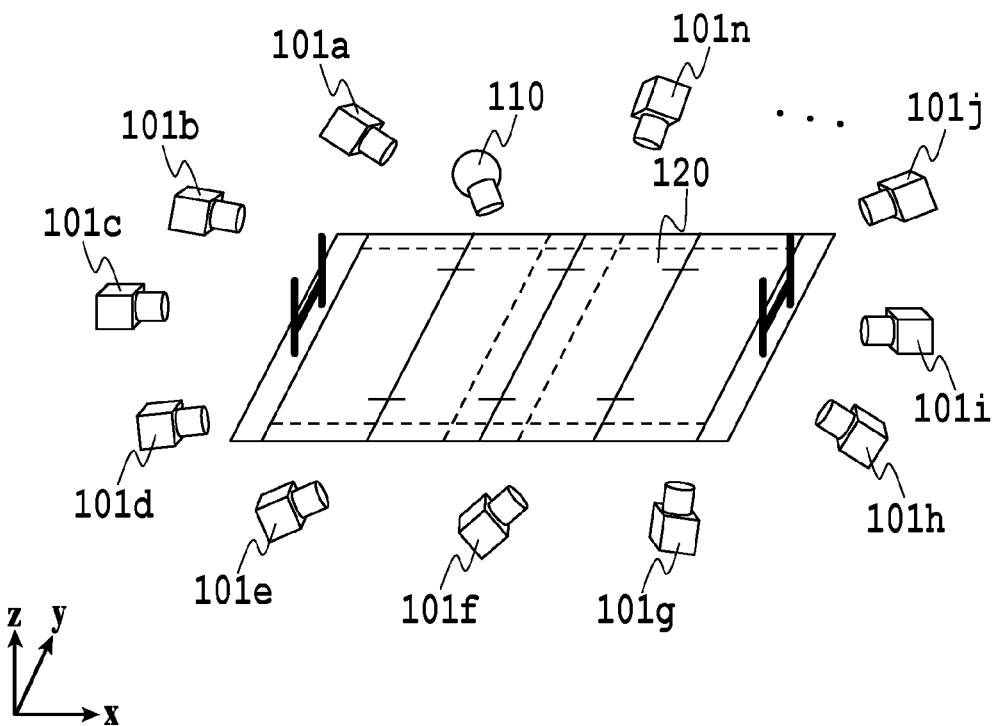

FIGS. 1A and 1B are diagrams showing an example configuration of an information processing system (a virtual viewpoint image generating system) that uses a captured image of a first output product (or a product) to generate, as a second output product, a virtual viewpoint image corresponding to the 3D model of the first output product or information related thereto. FIG. 1A shows an example configuration of an information processing system 100, and FIG. 1B shows an example of how sensor systems of the information processing system are installed. The information processing system (virtual viewpoint image generating system) 100 has a database 103, an image generating apparatus 104, a portable terminal 105, and a modeling apparatus 106.

The database 103 manages event information, 3D model information, and the like. The event information includes data indicating the storage locations of pieces of 3D model information on each object that are associated with all the time codes of an image capture target event. The objects may include not only a person or anon-person object that a user wants to model, but also a person or a non-person object that is not a target to be modeled. The 3D model information includes information related to a 3D model of an object.

These pieces of information may be, for example, information obtained by the sensor systems of the information processing system 100 or information obtained by sensor systems of a system different from the information processing system 100. For example, as shown in FIG. 1B, the sensor systems have sensor systems 101a to 101n each having at least one camera as an image capturing apparatus.

Note that the following description does not distinguish the n sensor systems, namely the sensor systems 101a to 101n, from one another and refer to them as a plurality of sensor systems 101, unless otherwise noted. The plurality of sensor systems 101 are installed to surround a region 120 which is an image capture target region, and the cameras of the plurality of sensor systems 101 capture images of the region 120 from different directions from one another. A virtual camera 110 captures images of the region 120 from a direction different from any of the cameras of the plurality of sensor systems 101. Details of the virtual camera 110 will be described later.

In a case where an image capture target is a game of a professional sport such as rugby or soccer, the region 120 is the field in a stadium, and the n (e.g., 100) sensor systems 101 are installed to surround the field. The image capture target region 120 may have not only people on the field but also a ball or other objects. Note that the image capture target is not limited to a field in a stadium, but also a music live event held in an arena or the like or a commercial shooting in a studio, as long as the plurality of sensor systems 101 can be installed. Note that the number of sensor systems 101 installed is not limited to any particular number. Also, the plurality of sensor systems 101 do not have to be installed over the entire perimeter of the region 120 and may be installed along only part of the periphery of the region 120 depending on, e.g., restrictions on installation locations. Also, the plurality of cameras of the plurality of sensor systems 101 may include image capturing apparatuses having different functionalities from each other, such as a telephoto camera and a wide-angle camera.

The plurality of cameras of the plurality of sensor systems 101 perform image capture in synchronization with one another and obtain a plurality of images. Note that the plurality of images may be captured images or images obtained by subjecting captured images to image processing such as, e.g., processing to extract a predetermined region.

Note that each of the sensor systems 101a to 101n may have a microphone (not shown) in addition to the camera. The microphones of the plurality of sensor systems 101 pick up sound in synchronization. Based on the sound thus picked up, an audio signal can be generated to be played along with display of the images by the image generating apparatus 104. Although descriptions concerning sound are omitted below to simplify description, an image and sound are basically processed together.

A plurality of images captured by the plurality of sensor systems 101 and a time code used for the image capture are combined and stored in the database 103. A time code is time information represented in an absolute value to uniquely identify the time of the image capture, and the time information can be specified with a format such as, for example, date:hour:minute:second.frame number.

Using the drawings, a description is given of an example table of event information and an example table of 3D model information that are managed by the database 103. FIGS. 2A and 2B are diagrams showing example of tables of information managed by the database 103, FIG. 2A showing an event information table and FIG. 2B showing a 3D model information table. In an event information table 210 managed by the database 103, as shown in FIG. 2A, the storage location of 3D model information is shown for each of the objects for every time code of the captured event. For instance, the event information table 210 shows that 3D model information on an object A at a time code "16:14:24.041" is stored in "DataA100." Note that the event information table 210 is not limited to showing all the time codes and may show the storage locations of 3D model information for part of the time codes. A time code is represented in an absolute value to uniquely identify the time of the image capture and can be specified with a format such as, for example, "date:hour:minute:second.frame number."

As shown in FIG. 2B, a 3D model information table 220 managed by the database 103 has stored therein data on the following items: "3D model," "texture," "average coordinates," "barycentric coordinates," and "maximum and minimum coordinates." Stored in "3D model" is data related to a 3D model per se, such as, for example, a group of dots or a mesh. Stored in "texture" is data related to a texture image added to the 3D model. Stored in "average coordinates" is data related to the average coordinates of all the dots forming the 3D model. Stored in "barycentric coordinates" is data related to the coordinates of a dot at the barycenter based on the coordinates of all the dots forming the 3D model. Stored in "maximum and minimum coordinates" is data on the maximum coordinates and minimum coordinates of dots among the coordinates of the dots forming the 3D model. Note that the items of data stored in the 3D model information table 220 are not limited to all of the "3D model," "texture," "average coordinates," "barycentric coordinates," and "maximum and minimum coordinates." For example, the 3D model information table 220 may only have "3D model" and "texture" or may additionally have other items. The database 103 also manages information related to 3D models (not shown). In a case where an image capture target is a rugby game, the information related to 3D models includes, e.g., information on the date and venue of the rugby game, information on the opposition, and information on the rugby players.

Using the information shown in FIGS. 2A and 2B, in response to a certain time code being specified, a 3D model and a texture image can be obtained for each object as 3D model information related to the time code specified. For instance, in FIG. 2A, DataN100 can be obtained as 3D model information on an object N at a time code "16:14:24.041." 3D model information associated with other time codes and objects can also be obtained similarly upon specification. It is also possible to specify a certain time code and obtain 3D model information on all the objects at that time code collectively. For instance, in response to specification of a time code "16:14:25.021," 3D model information on all the objects, namely DataA141, DataB141, . . . , DataN141, may be obtained.

An image obtained by image capture by a plurality of sensor systems as described above is called a multi-viewpoint image, and a 3D model representing the three-dimensional shape of an object can be generated from such a multi-viewpoint image. Specifically, foreground images which are an extraction of a foreground region corresponding to an object such as a person or a ball and background images which are an extraction of a background region other than the foreground region are obtained from the multi-viewpoint image, and a foreground 3D model can be generated for each object based on the plurality of foreground images. These 3D models are generated using a shape estimation method such as, e.g., visual hulls, and are each formed by a group of dots. However, the data format of a 3D model representing the shape of an object is not limited to this. Also, the 3D model thus generated is recorded in the database 103 in association with the corresponding time code and object. Note that the method for generating a 3D model is not limited to this, as long as the 3D model is recorded in the database 103.

Note that for a 3D model of a background object such as the field and a spectator stand, a time code such as 00:00: 00.000 may be recorded in the database 103 as 3D model information.

Referring back to FIG. 1A, the image generating apparatus 104 obtains 3D models from the database 103 and generates a virtual viewpoint image based on the 3D models obtained. Specifically, the image generating apparatus 104 performs coloring processing on each dot forming the obtained 3D models by obtaining an appropriate pixel value from the multi-viewpoint image. The image generating apparatus 104 then disposes the colored 3D models in a three-dimensional virtual space, projects the 3D models onto a virtual camera, and renders the 3D models, thereby generating a virtual viewpoint image. The image generating apparatus 104 also generates information related to the virtual viewpoint image.

For example, as shown in FIG. 1B, the virtual camera 110 is set in a virtual space associated with the target region 120 and can view the region 120 from a viewpoint different from any of the cameras of the plurality of sensor systems 101. The viewpoint of the virtual camera 110 is determined by the position and attitude thereof. Details of the position and attitude of the virtual camera 110 will be described later.

The image generating apparatus 104 may determine the position and attitude of the virtual camera based on information sent from the portable terminal 105. Details of this processing will be described later using the drawings.

A virtual viewpoint image is an image representing what it looks like from the virtual camera 110 and is also called a free-viewpoint video. The virtual viewpoint image generated by the image generating apparatus 104 and information related thereto may be displayed on the image generating apparatus 104 or may be sent back to the portable terminal 105 as a response and displayed on the portable terminal 105, the portable terminal 105 being a different device that has sent the captured image data to the image generating apparatus 104. It goes without saying that the virtual viewpoint image may be displayed on both of the image generating apparatus 104 and the portable terminal 105.

The modeling apparatus 106 is, for example, a 3D printer or the like, and models a first output product 107 such as, for example, a doll (a 3D model figure) based on a virtual viewpoint image generated by the image generating apparatus 104. The first output product 107 is an output product generated based on 3D models recorded in the database 103, and is a target to be captured by the portable terminal 105 in the present embodiment. Examples of the first output product include a 3D model figure modeled by the modeling apparatus 106 such as a 3D printer using 3D models. Now, a 3D model figure as an example of the first output product 107 is described using the drawings.

Figure 3A:
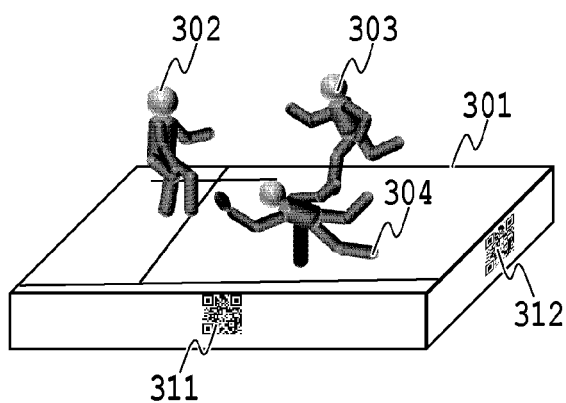
FIGS. 3A to 3F are diagrams showing an example of a first output product and an example of a second output product.
Figure 3B:
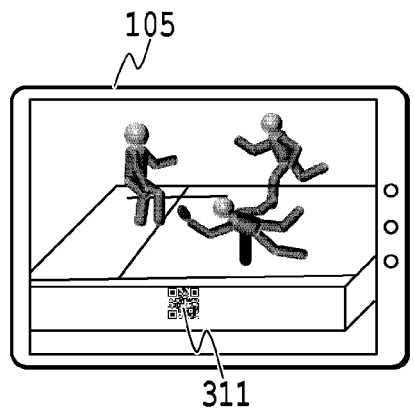
Figure 3C:
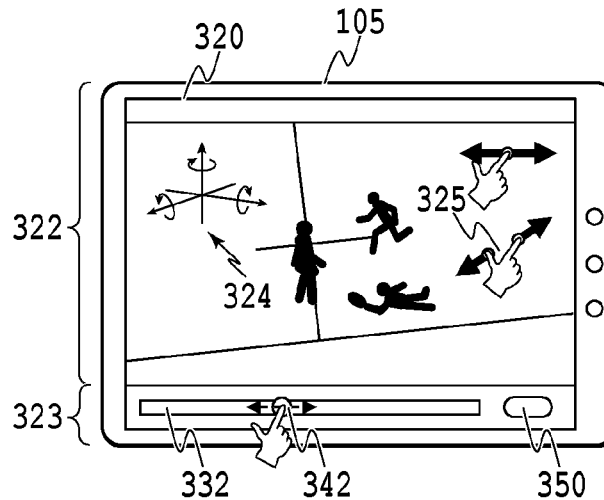

FIGS. 3A to 3F are diagrams illustrating processing in which an image of a 3D model figure is captured, and information related to the 3D model figure is generated based on the captured image. FIG. 3A shows an example 3D model figure, FIG. 3B shows an example of a captured image of the 3D model figure in FIG. 3A, and FIG. 3C shows an example virtual viewpoint image corresponding to the 3D model figure in FIG. 3A. FIG. 3A shows an example of modeling using 3D models at a certain time code, with 3D models for a rugby game being recorded in the database 103. Specifically, in the example shown, a scene where an offload pass is made in a rugby game is selected as a critical scene leading to a score, and a 3D model figure is modeled using 3D models corresponding to the time code of that scene.

As shown in FIG. 3A, the 3D model figure has a base 301, a first figure body 302, a second figure body 303, and a third figure body 304. The first figure body 302, the second figure body 303, and the third figure body 304 correspond to respective players as objects and are affixed to the top of the base 301. In the 3D model figure in FIG. 3A, the player of the third figure body 304 has the ball and is about to make an offload pass.

Two-dimensional codes 311, 312 are added to the front and side surfaces of the base 301, holding information on the image capture direction, attitude, and the like regarding image capture by the portable terminal 105. Although two two-dimensional codes 311, 312 are added to the base 301 of the first output product shown in FIG. 3A, the number and positions of the two-dimensional codes added to the first output product are not limited to this. Also, a two-dimensional code may include not only the information on the image capture direction and attitude, but also image information related to the first output product, such as information on the game where the 3D models were captured. The form for adding the information to the first output product is not limited to a two-dimensional code, and other forms such as watermark information may be used.

The first output product 107 is not limited to a three-dimensional product such as a 3D model figure, as long as it is generated using 3D models in the database 103. For example, the first output product 107 may be a modeled product printed on a plate or the like or may be a virtual viewpoint image displayed on a display.

After obtaining 3D models in the database 103, the image generating apparatus 104 may output the 3D models to the modeling apparatus 106 so that the first output product 107 such as a 3D model figure may be modeled.

Referring back to FIGS. 1A and 1B, the portable terminal 105 captures an image of the first output product 107 such as a 3D model figure and sends the captured image data to the image generating apparatus 104. The captured image data (the captured image) may be image data or image data containing attribute information. Now, an example of the captured image is described using FIG. 3B. FIG. 3B shows a state where an image obtained by image capture of the 3D model figure shown in FIG. 3A as the first output product is displayed on a display unit of the portable terminal. The portable terminal 105 transmits captured image data on the first output product to the image generating apparatus, receives, as a response, a virtual viewpoint image generated by the image generating apparatus 104 or image information related thereto as a second output product, and displays the virtual viewpoint image or the image information. Details of this processing will be described later using the drawings.

Although a case where the virtual viewpoint image is a video is mainly described in the present embodiment, the virtual viewpoint image may be a still image instead.

(Configuration of the Image Generating Apparatus)

Figure 4A:
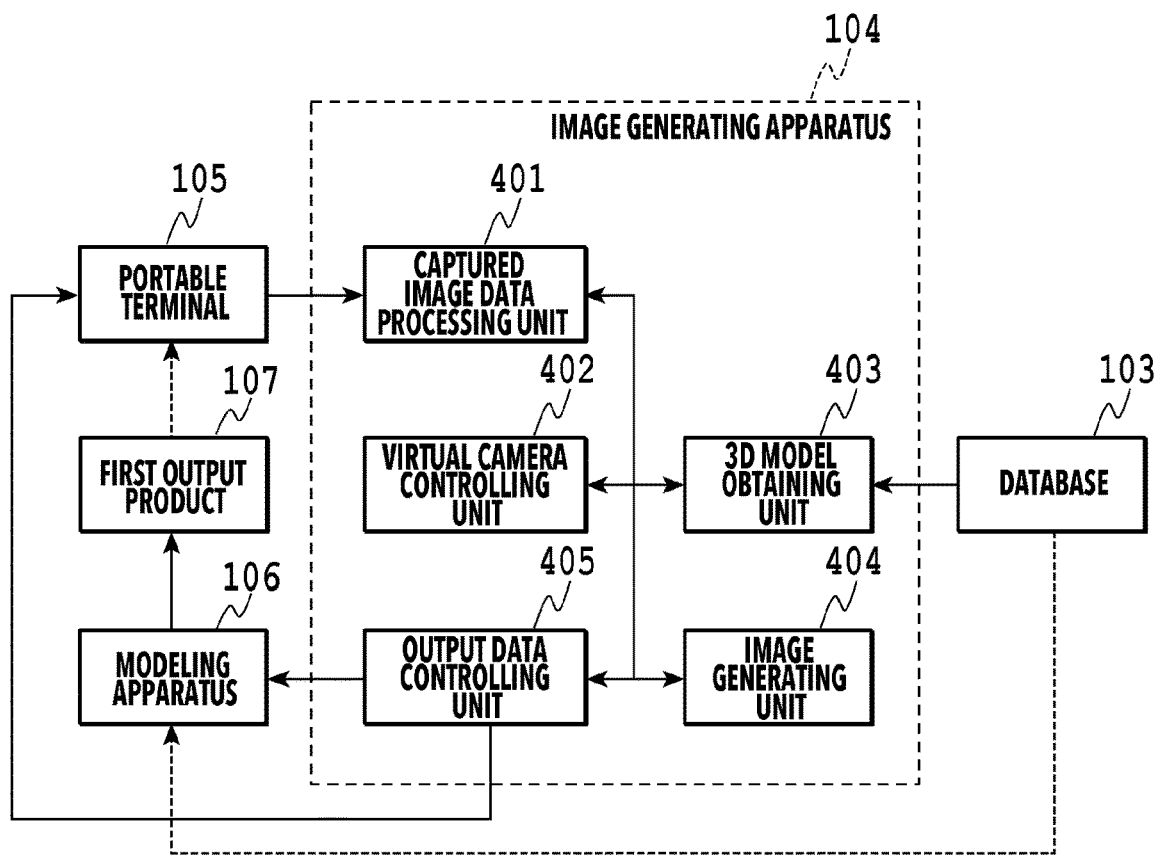
FIGS. 4A and 4B are diagrams showing an example configuration of an image generating apparatus.
Figure 4B:
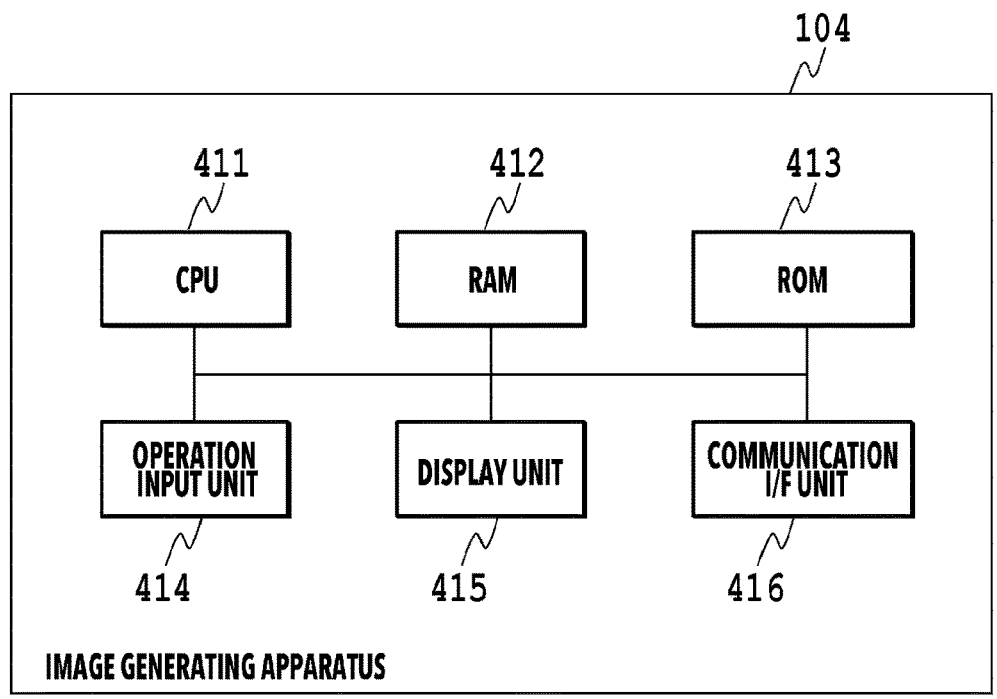

An example configuration of the image generating apparatus 104 is described using the drawings. FIGS. 4A and 4B are diagrams showing an example configuration of the image generating apparatus 104, FIG. 4A showing an example functional configuration of the image generating apparatus 104 and FIG. 4B showing an example hardware configuration of the image generating apparatus 104.

The image generating apparatus 104 has, as shown in FIG. 4A, a captured image data processing unit 401, a virtual camera controlling unit 402, a 3D model obtaining unit 403, an image generating unit 404, and an output data controlling unit 405. Using these functional units, the image generating apparatus 104 uses captured image data obtained by image capture of a first output product generated from 3D models to generate a virtual viewpoint image generated from the same 3D models and image information related thereto as a second output product. Overviews of the functions are described here, and details of processing will be described later.

The captured image data processing unit 401 receives captured image data obtained by the portable terminal 105 capturing an image of the first output product. The captured image data processing unit 401 then obtains first-output-product generation information from the captured image data received. The first-output-product generation information is information for identifying data used to generate the first output product. Examples of the first-output-product generation information include an identifier of the database in which 3D models used for the first output product are recorded and a time code for the 3D models. The identifier of a database is information uniquely identifying the database. Thus, these pieces of information allow unique identification of the 3D models used for the first output product.

The captured image data processing unit 401 also obtains, from the captured image data, information on, e.g., the position, attitude, and focal length of the image capturing apparatus that captured the first output product (hereinafter referred to as image capture information). The position and attitude of the image capturing apparatus may be obtained from, e.g., the two-dimensional codes 311, 312 included in the captured image data or may be obtained in a different way. Embodiment 2 will show a different example method for obtaining the above.

Note that the first-output-product generation information and the image capture information that can be obtained from the captured image data are not limited to the above. For example, in a case where the first output product is related to a sports game, information related to the game, such as the outcome of the game or information on the opposing team, may be included.

The virtual camera controlling unit 402 controls a virtual camera according to the position, attitude, and focal length of the image capturing apparatus obtained via the captured image data processing unit 401. Details of the virtual camera and the position and attitude thereof will be described later using the drawings.

The 3D model obtaining unit 403 obtains relevant 3D models from the database 103 by specifying the database identifier and time code obtained via the captured image data processing unit 401. Note that the time code may be specified by, e.g., a user operation performed with respect to the portable terminal 105.

The image generating unit 404 generates a virtual viewpoint image based on the 3D models obtained by the 3D model obtaining unit 403. Specifically, the image generating unit 404 performs coloring processing on each dot forming the 3D models by obtaining an appropriate pixel value from the images. The image generating unit 404 then disposes the colored 3D models in a three-dimensional virtual space, projects the 3D models onto the virtual camera (the virtual viewpoint) controlled by the virtual camera controlling unit 402, and renders the 3D models, thereby generating a virtual viewpoint image.

The virtual viewpoint image generated here is generated using the first-output-product generation information (information identifying the 3D models) and the image capture information (such as the position and attitude of the image capturing apparatus that captured the image of the first output product) obtained by the captured image data processing unit 401 from the captured image data on the first output product.

However, the method for generating a virtual viewpoint image is not limited to this, and various methods may be used, such as one that generates a virtual viewpoint image using projection transformation of captured images without using 3D models.

The output data controlling unit 405 outputs the virtual viewpoint image generated by the image generating unit 404 to an external apparatus, e.g., the portable terminal 105, as a second output product. The output data controlling unit 405 may also output related information on the first output product obtained by the captured image data processing unit 401 to an external apparatus as a second output product.

Note that the output data controlling unit 405 may generate modeling data from the 3D models and output the generated modeling data to the modeling apparatus 106, so that the first output product may be produced by the modeling apparatus 106.

(Hardware Configuration of the Image Generating Apparatus)

Next, the hardware configuration of the image generating apparatus 104 is described using FIG. 4B. As shown in FIG. 4B, the image generating apparatus 104 has a central processing unit (CPU) 411, a random-access memory (RAM) 412, a read-only memory (ROM) 413, an operation input unit 414, a display unit 415, and a communication interface (I/F) unit 416.

The CPU 411 performs processing using the programs and data stored in the RAM 412 and the ROM 413.

The CPU 411 performs overall control of the operation of the image generating apparatus 104 and executes processing for implementing the functions shown in FIG. 4A. Note that the image generating apparatus 104 may have one or more dedicated hardware pieces apart from the CPU 411, so that at least part of the processing executed by the CPU 411 may be executed by the one or more dedicated hardware pieces. Examples of the dedicated hardware pieces include an application-specific integrated circuit (ASIC), a field-programmable gate array (FPGA), and a digital signal processor (DSP).

The ROM 413 holds programs and data. The RAM 412 has a work area for temporary storage of programs and data read from the ROM 413. The RAM 412 also provides a work area for the CPU 411 to use in executing processing.

The operation input unit 414 is, for example, a touch panel, and receives an operation inputted by a user and obtains information inputted by the user operation received. Examples of input information include information related to the virtual camera and information related to the time code for a virtual viewpoint image to be generated. Note that the operation input unit 414 may be connected to an external controller and receive operation-related information inputted by a user. The external controller is, for example, an operation apparatus such as a three-axis controller like a joy stick or a mouse. However, the external controller is not limited to these.

The display unit 415 is a touch panel or a screen and displays a virtual viewpoint image generated. In a case of a touch panel, the operation input unit 414 and the display unit 415 are configured integrally.

The communication I/F unit 416 performs transmission and reception of information to and from the database 103, the portable terminal 105, the modeling apparatus 106, and the like via, for example, a LAN or the like. The communication I/F unit 416 may also transmit information to an external screen via an image output port supporting, e.g., High-Definition Multimedia Interface (HDMI)(registered trademark) or Serial Digital Interface (SDI). Also, for example, the communication I/F unit 416 obtains 3D model information and the like from the database 103 via Ethernet or the like. For example, the communication I/F unit 416 performs, via Ethernet, short-distance communications, or the like, reception of captured image data from the portable terminal 105 and transmission of a second output product such as a virtual viewpoint image and image information related thereto.

(Virtual Viewpoint (Virtual Camera) and Virtual Viewpoint Operating Screen)

Figure 5A:
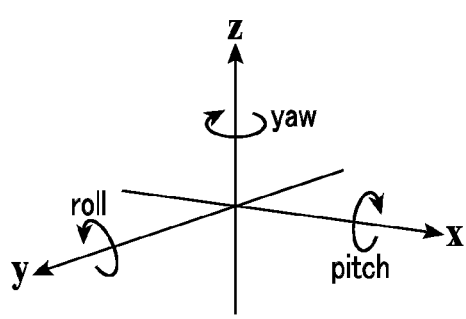
FIGS. 5A to 5E are diagrams illustrating a virtual camera.
Figure 5B:
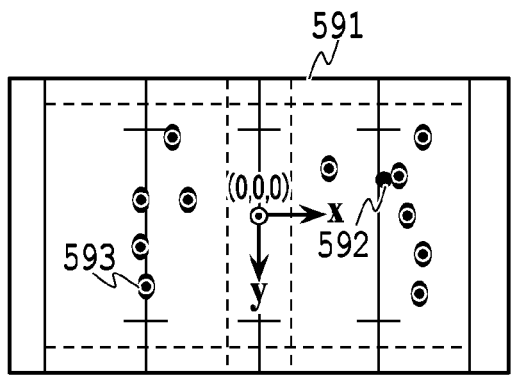
Figure 5C:
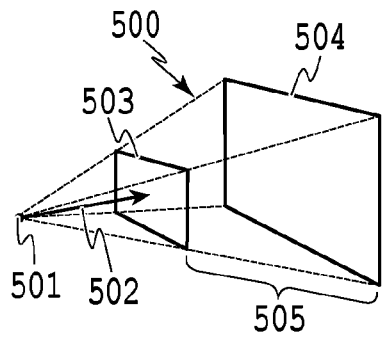
Figure 5D:
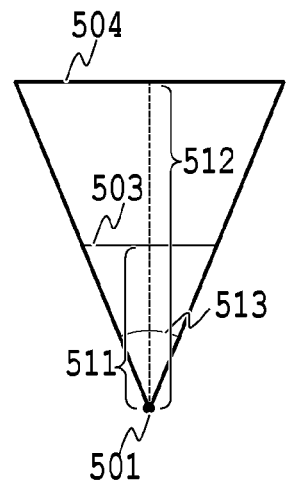
Figure 5E:
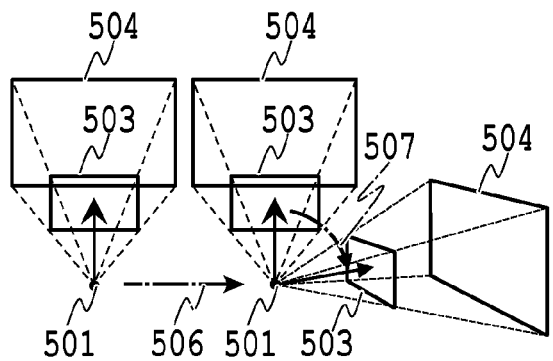

The virtual camera 110 and the position and attitude thereof are described using the drawings. FIGS. 5A to 5E are diagrams illustrating the virtual camera 110 and the position and attitude thereof. FIG. 5A shows the coordinate system, FIG. 5B shows an example field to which the coordinate system in FIG. 5A is applied, FIGS. 5C and 5D show an example rendering range of the virtual camera, and FIG. 5E shows an example of how the virtual camera moves.

First, a description is given of the coordinate system which represents a three-dimensional space to be captured and which is used as the basis for setting a virtual viewpoint. As shown in FIG. 5A, in the present embodiment, a Cartesian coordinate system which represents a three-dimensional space with three axes, the x-axis, the y-axis, and the z-axis, is used. This Cartesian coordinate system is set for each object shown in FIG. 5B, i.e., a field 591 in the rugby stadium and a ball 592, players 593, and the like on the field 591. The Cartesian coordinate system may also be set for installations within the rugby stadium such as spectator stands and billboards surrounding the field 591. Specifically, the origin (0, 0, 0) is set at the center of the field 591. Then, the x-axis is set to the direction of the longer side the field 591, the y-axis is set to the direction of the shorter side of the field 591, and the z-axis is set to the direction perpendicular to the field 591. Note that the directions of the axes are not limited to these. The position and attitude of the virtual camera 110 are set using such a coordinate system.

Next, the rendering range of the virtual camera is described using the drawings. In a quadrangular pyramid 500 shown in FIG. 5C, a vertex 501 represents the position of the virtual camera 110, and a vector 502 in the direction of the line of sight originating from the vertex 501 represents the attitude of the virtual camera 110. Note that the vector 502 is also called an optical-axis vector of the virtual camera. The position of the virtual camera is represented by the components of the axes (x, y, z), and the attitude of the virtual camera 110 is represented by a unit vector having the components of the axes as scalars. The vector 502 that represents the attitude of the virtual camera 110 passes the center points of a front clipping plane 503 and a back clipping plane 504. The viewing frustum of the virtual camera, which serves as a 3D model projection range (the rendering range), is a space 505 between the front clipping plane 503 and the back clipping plane 504.

Next, components indicating the rendering range of the virtual camera are described using the drawings. FIG. 5D is a view showing the virtual viewpoint in FIG. 5C from above (the Z-direction). The rendering range is determined by the following values: a distance 511 from the vertex 501 to the front clipping plane 503, a distance 512 from the vertex 501 to the back clipping plane 504, and an angle of view 513 of the virtual camera 110. These values may be predetermined (prescribed) values set in advance or may be set values to which the predetermined values have been changed by user operations. Also, the angle of view 513 may be a value obtained based on a variable set as the focal length of the virtual camera 110. Note that the relation between an angle of view and a focal length is common technology and is therefore not described here.

Next, a description is given of changing the position of the virtual camera 110 (or moving the virtual viewpoint) and changing (or rotating) the attitude of the virtual camera 110. The virtual viewpoint can be moved and rotated in a space represented by three-dimensional coordinates. FIG. 5E is a diagram illustrating movement and rotation of the virtual camera. In FIG. 5E, a dot-and-dash line arrow 506 represents movement of the virtual camera (or the virtual viewpoint), and a dot-and-dash line arrow 507 represents rotation of the virtual camera (or the virtual viewpoint) thus moved. The movement of the virtual camera is represented by components of the respective axes (x, y, z), and the rotation of the virtual camera is represented by yaw, which is rotation about the z-axis, pitch, which is rotation about the x-axis, and roll, which is rotation about the y-axis. In this way, the virtual camera can be freely moved and rotated in the three-dimensional space of a subject (the field), so that a virtual viewpoint image can be generated with its rendering range being any given region in the subject.

In the present embodiment, as described above, the position, attitude, and focal length of the image capturing apparatus are obtained as image capture information from captured image data on the first output product 107 (such as a 3D model figure) captured by the portable terminal 105 or the like. Then, the virtual camera is controlled to move or rotate according the values of the position, attitude, and focal length of the image capturing apparatus thus obtained.

(Second-Output-Product Generation Processing)

Figure 6:
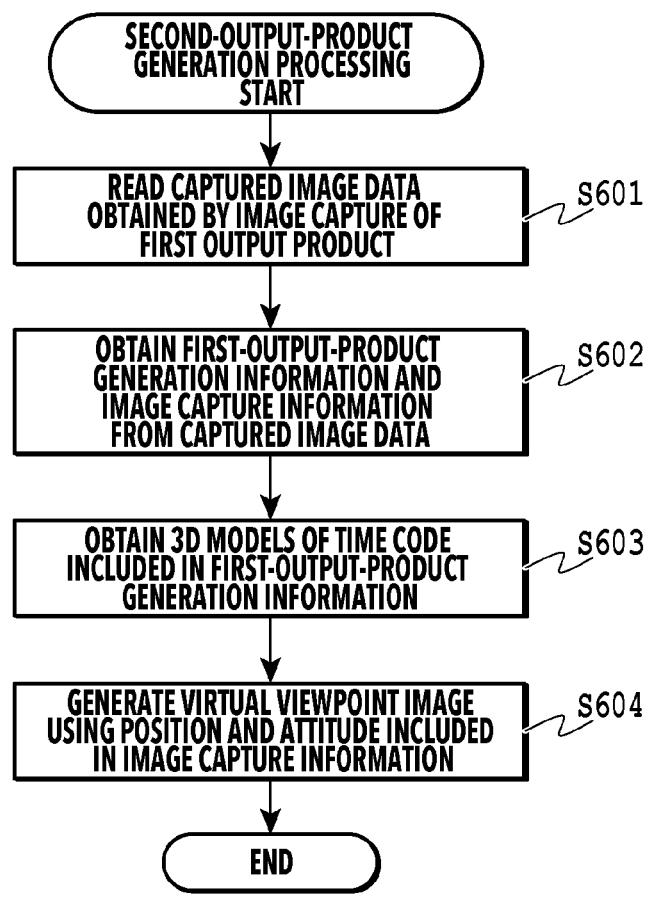
FIG. 6 is a flowchart showing the sequence of steps of second-output-product generation processing.

Next, a description is given of second-output-product generation processing performed by the image generating apparatus 104. FIG. 6 is a flowchart showing the sequence of steps of the second-output-product generation processing. Using the drawings, a description is given of processing in which captured image data obtained by image capture of a first output product generated from shape data (3D models) representing the three-dimensional shapes of objects is used to generate a virtual viewpoint image generated from the 3D models, image information related thereto, or the like as a second output product. Note that a series of the following processing steps are implemented by the CPU 411 executing a predetermined program to effect the operation of the functional units shown in FIG. 4A. Hereinbelow, "S" denotes Step. This applies to the rest of the following description.

In S601, the image generating unit 404 reads captured image data obtained by image capture of the first output product 107. Specifically, via the captured image data processing unit 401, the image generating unit 404 obtains captured image data obtained by, e.g., the portable terminal 105 capturing an image of the first output product 107. The first output product 107 is, for example, a 3D model figure or the like outputted from the modeling apparatus 106 based on 3D models in the database 103. Examples of the first output product 107 include the 3D model figure shown in FIG. 3A.

In S602, from the captured image data obtained in the processing in S601, the image generating unit 404 obtains first-output-product generation information (a database identifier and a time code) and image capture information (the position, attitude, and focal length of the image capturing apparatus). Examples of the captured image data include the image shown in FIG. 3B. Examples of how to obtain the image capture information include obtaining it from a two-dimensional code as described above in the section pertaining to the configuration of the image generating apparatus. In a case where the captured image data obtained is the image in FIG. 3B, the identifier of the database including the 3D models used for the first output product, the time code, and information on the position and attitude of the image capturing apparatus are obtained from the two-dimensional code 311 included in this image.

In S603, the image generating unit 404 obtains the relevant 3D models from the database 103 using the database identifier and the time code included in the first-output-product generation information obtained in the processing in S602.

In S604, the image generating unit 404 performs control of the virtual camera, such as moving or rotating the virtual camera, according to the position, attitude, and focal length of the image capturing apparatus included in the image capture information obtained in the processing in S602. The image generating unit 404 then generates a virtual viewpoint image as a second output product using the virtual camera thus controlled and the 3D models obtained in the S603. Examples of how to generate a virtual viewpoint image include the virtual viewpoint image generation method described in the section pertaining to the configuration of the image generating apparatus.

Now, using FIG. 3C, a description is given of a virtual viewpoint image as an example of a second output product. FIG. 3C shows a virtual viewpoint image generated using the 3D models associated with the time code obtained from the captured image data and the virtual camera at the position and attitude obtained from the captured image data. In other words, the 3D model figure (the first output product) in FIG. 3A and the virtual viewpoint image (the second output product) in FIG. 3C show the 3D models associated with the same time code from the same position and the same direction. Note that the operation screen 320 has a virtual camera operation region 322 that receives a user operation for setting the position and attitude of the virtual camera 110 and a time code operation region 323 that receives a user operation for setting a time code. First, the virtual camera operation region 322 is described. Since the operation screen 320 is displayed on the touch panel, the virtual camera operation region 322 receives typical touch operations 325 such as a tap, a swipe, a pinch-in, and a pinch-out as user operations. In response to this touch operation 325, the position or the focal length (the angle of view) of the virtual camera is adjusted. The virtual camera operation region 322 also receives, as a user operation, a touch operation 324 such as holding down on an axis in the Cartesian coordinate system. In response to this touch operation 324, the virtual camera 110 is rotated about the x-axis, the y-axis, or the z-axis to adjust the attitude of the virtual camera. By allocation of touch operations performed on the operation screen 320 to moving and rotating the virtual camera, scaling up, and scaling down in advance, the virtual camera 110 can be freely operated. The method for the above operation is publicly known and is therefore not described here.

Next, the time code operation region 323 is described. The time code operation region 323 has a main slider 332 and a knob 342. The time code operation region 323 has an output button 350 as a plurality of elements for operating the time code.

The main slider 332 is an input element with which an operation can be performed to select a desired time code from among all the time codes in image capture data. Once the position of the knob 342 is moved to a desired position by a drag operation or the like, a time code corresponding to the position of the knob 342 is specified. In other words, adjusting the position of the knob 342 on the main slider 332 allows specification of any given time code.

Figure 3D:
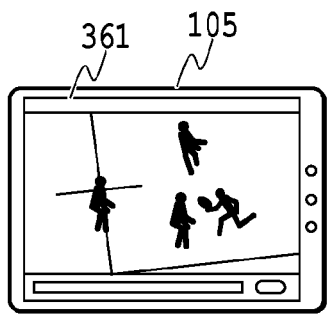

Instead of using only the certain time code included in the first-output-product generation information, the processing in S604 may use time codes in a predetermined range from a time code a little earlier than the certain time code and to a time code a litter later than the certain time code. In this case, 3D models associated with the time codes in this predetermined range are obtained. Thus, a critical scene modeled as a 3D model figure as a first output product can be presented with virtual viewpoint images as a second output product, showing a series of actions starting from the little earlier time code. The virtual viewpoint images played in this way are shown in the order of FIGS. 3D to 3F.

Figure 3E:
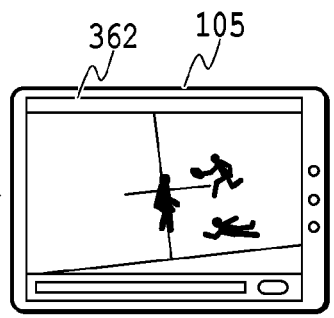
Figure 3F:
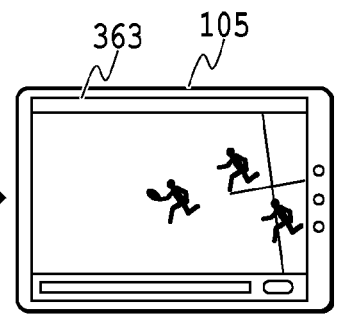

FIG. 3E shows a virtual viewpoint image 362 which is the same as the virtual viewpoint image in FIG. 3C described earlier and which is generated using 3D models associated with the same time code (T1) as that for the 3D model figure in FIG. 3A as a first output product. FIG. 3D shows a virtual viewpoint image 361 generated using 3D models associated with a time code (T1−Δt1) a little earlier than the virtual viewpoint image 362 shown in FIG. 3E. FIG. 3F shows a virtual viewpoint image 363 generated using 3D models associated with a time code (T1+Δt1) a little later than the virtual viewpoint image 362 shown in FIG. 3E. In an event where an image of the 3D model figure as the first output product is captured by the portable terminal 105 or the like, the virtual viewpoint images in FIGS. 3D, 3E, and 3F can be played on the portable terminal 105 or the like in this order as a second output product. It goes without saying that there are frames not shown in the drawings between the virtual viewpoint image 361 shown in FIG. 3D and the virtual viewpoint image 363 shown in FIG. 3F, and virtual viewpoint images from the time code (T1−Δt1) to the time code (T1+Δt1) can be played at, e.g., 60 fps. The width (2Δt1) from the little earlier time code (T1−Δt1) to the little later time code (T1+Δt1) may be included in the first-output-product generation information in advance or may be specified by a user operation. Note that in regard to the position and attitude of the virtual camera, the position and attitude obtained from the captured image (e.g., FIG. 3B) obtained by image capture of the first output product may be used for the virtual viewpoint image associated with the certain time code (FIG. 3E), and different positions and attitudes may be used for virtual viewpoint images associated with other time codes. For example, the time code and the position and attitude may be adjusted using the portable terminal 105 by a user operation adjusting the position of the time code knob 342 or a tap operation performed on the output button 350.

Note that the virtual viewpoint image generated as a second output product may be transmitted to the portable terminal 105 to be displayed on the screen of the portable terminal 105, and in addition to the virtual viewpoint image, information on, e.g., the outcome of the game or the like may be displayed as image information related to the virtual viewpoint image.

As thus described, based on a captured image of an output product outputted based on the same 3D models as those used to generate a virtual viewpoint image, the present embodiment can output a virtual viewpoint image corresponding to the same 3D models as those used to generate the output product or image information related to the virtual viewpoint image. In other words, a captured image is obtained by image capture of a 3D model figure generated based on a scene corresponding to a specific time in a virtual viewpoint image, and then a virtual viewpoint image of the scene corresponding to the specific time can be generated using the captured image of the 3D model figure.

For instance, in a case of using 3D models in a rugby game, in response to a portable terminal capturing an image of a 3D model figure, a virtual viewpoint image using at least the same 3D models associated with the same time code can be displayed.

Also, in this event, the virtual viewpoint image viewed in the same direction as the direction in which the 3D model figure was captured can be displayed.

In the case described above, corresponding 3D models are identified based on a two-dimensional code obtained from captured image data, and a virtual viewpoint image corresponding to the identified 3D models is generated. However, the method for identifying the corresponding 3D models is not limited to the one using a two-dimensional code. For example, features of an object (such as, e.g., the player's uniform color and number) in each scene are extracted to create a plurality of patterns and manage them in a database in advance. Then, corresponding 3D models may be identified based on results of image processing such as pattern matching. By such identification of corresponding 3D models, a virtual viewpoint image corresponding to the identified 3D models, image information related to the virtual viewpoint image, or the like can be generated.

Embodiment 2

In a mode described in the present embodiment, detailed position and attitude are obtained from captured image data obtained by a portable terminal or the like capturing an image of a first output product generated based on 3D models used to generate a virtual viewpoint image, and a second output product is generated using the 3D models according to the same position and attitude.

In the present embodiment, the configuration of the information processing system and the configuration of the image generating apparatus are the same as that in FIGS. 1A and 1B and that in FIGS. 4A and 4B, respectively, and are therefore not described. Differences are described.

The present embodiment has the same configuration as Embodiment 1 in that the image generating apparatus 104 processes captured image data on a first output product captured by the portable terminal 105 to generate a second output product based on information included in the captured image data. The present embodiment can execute a flowchart of the second-output-product generation processing in a manner similar to that in FIG. 6, but is different from Embodiment 1 in how the captured image data is processed in S604.

In the present embodiment, a second output product is generated using the angle of view of captured image data obtained by the portable terminal 105 capturing an image of a first output product. Using FIGS. 7A to 7E, a description is given of how a second output product is generated reflecting the angle of view of the captured image data on the first output product.

Figure 7A:
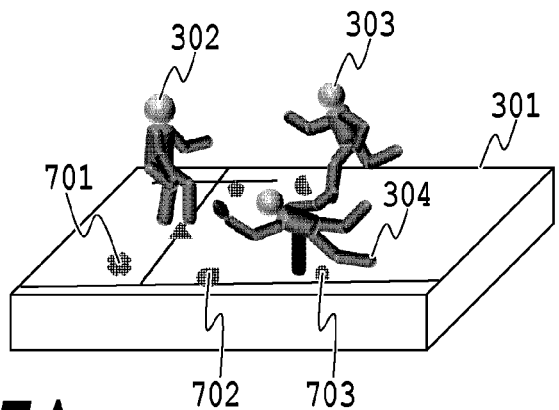
FIGS. 7A to 7E are diagrams showing an example of a first output product and an example of a second output product.
Figure 7B:
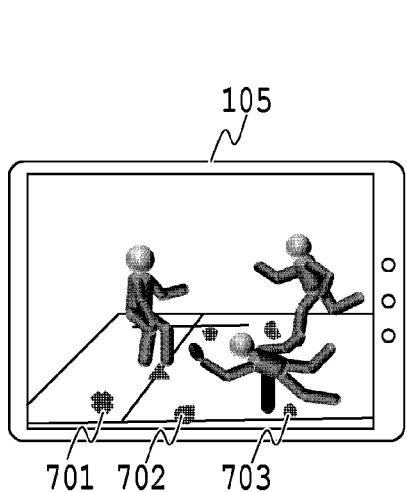
Figure 7C:
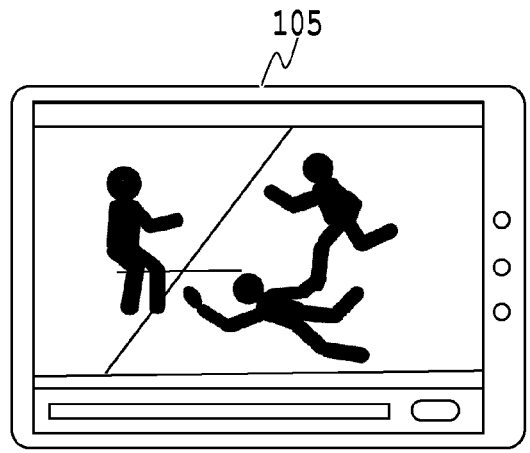

FIGS. 7A to 7E are diagrams illustrating processing in which an image of a 3D model figure is captured, and information related to the 3D model figure is generated based on the captured image. FIG. 7A shows an example 3D model figure as an example of a first output product, similar to the one in FIG. 3A. FIG. 7B shows an example captured image of the 3D model figure in FIG. 7A, and FIG. 7C shows an example virtual viewpoint image having objects corresponding to the 3D model figure in FIG. 7A.

As shown in FIG. 7A, the 3D model figure has the base 301, the first figure body 302, the second figure body 303, and the third figure body 304. The first figure body 302, the second figure body 303, and the third figure body 304 correspond to players as objects and are affixed to the top of the base 301. A marker 701, a marker 702, and a marker 703 are added to the upper surface of the base 301 near the front surface of the base 301 to allow recognition of coordinates. For the sake of convenience, these markers 701 to 703 will be referred to as coordinate markers (they are also called, e.g., calibration targets). The coordinate markers 701 to 703 may be visible or may be invisible in the form of, e.g., watermark information. The number of coordinate markers addable to a first output product is not limited to three and may be less than or more than three. The location where the coordinate markers 701 to 703 are added is not limited to the base 301, either. The coordinate markers 701 to 703 may be added to unnoticeable locations such as, for example, the uniforms or uniform numbers of the figure bodies 302 to 304. The coordinate markers 701 to 703 may also be unnoticeably embedded in the field, the lines, or the like on the base 301. Note that the shapes of the coordinate markers 701 to 703 are not limited to any particular shapes, as long as the coordinate markers 701 to 703 can be uniquely identified.

As shown in FIG. 7B, captured image data includes the coordinate markers 701 to 703. Coordinate information is obtained from the plurality of coordinate markers 701 to 703, and the position and coordinates of the portable terminal 105 at the time of the image capture can be accurately calculated using the coordinate information obtained. The method for this calculation is called camera calibration or the like, and various approaches are publicly known. Thus, this calculation method is not described here. Note that the number of coordinate markers necessary for calculation (e.g., six markers) is different depending on the approach used. Thus, in a case where an image of the first output product captured by the portable terminal 105 does not include a necessary number of coordinate markers, a warning image may be presented on the screen of the portable terminal 105 to inform that an image needs to be captured to include the necessary number of coordinate markers.

The coordinate markers 701 to 703 included in the first output product each have coordinates defined therefor based on the coordinate system shown in FIG. 5A. Since their coordinate system is the same as that for the 3D data included in the database 103, the position and attitude of the image capturing camera obtained by camera calibration can be obtained based on the same coordinate system for the 3D models. Thus, in the present embodiment, a virtual viewpoint image generated using the position, coordinates, and focal length obtained from the captured image data can have the same angle of view as that of the portable terminal 105 that captured the image of the first output product. FIG. 7C shows a virtual viewpoint image as an example of a second output product generated in this way. As can be seen in FIGS. 7B and 7C, the captured image of the 3D model figure (the first output product) in FIG. 7B and the virtual viewpoint image (the second output product) in FIG. 7C have the same angle of view.

Note that since the coordinate markers 701 to 703 are added to the first output product and are not included in the 3D models recorded in the database 103, they are not included in the virtual viewpoint image shown in FIG. 7C as the second output product.

Note that 3D models may be obtained using not only the time code (T2) included in the first-output-product generation information, but time codes from a time code (T2−Δt2) a little earlier than the time code (T2) to a time code (T2+Δt2) a litter later than the time code (T2). In this case, virtual viewpoint images of all those time codes may be displayed at the angle of view of the captured image data, or the angle of view of the captured image data may be used only for the time code included in the first-output-product generation information. In the latter case, a virtual viewpoint image associated with the little earlier time code (T2−Δt2) may be generated with a different angle of view, and the following virtual viewpoint images may be generated with angles of view gradually nearing the angle of view of the captured image data toward the time code (T2).

Figure 7D:
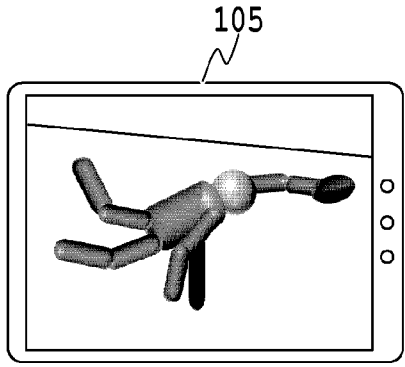
Figure 7E:
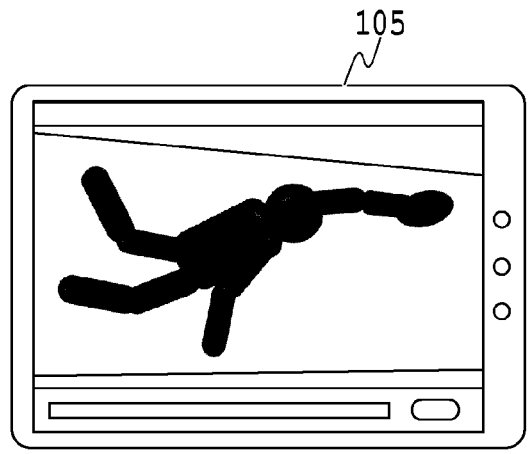

Next, another example where an image of the first output product in FIG. 7A is captured by the portable terminal 105 is described using FIG. 7D showing an example of the captured image data and FIG. 7E showing an example of a second output product generated based on the captured image data in FIG. 7D.

In the captured image data shown in FIG. 7D, the third figure body 304 included in the 3D model figure in FIG. 7A as a first output product is captured with the third figure body 304 being zoomed in on using the zooming function of the portable terminal 105. In a case where the third figure body 304 in the captured image data includes a plurality of coordinate markers (not shown), the position and attitude of the image capturing camera to have the same angle of view as that in FIG. 7D can be calculated using the camera calibration described above.

Then, the second output product shown in FIG. 7E can be obtained as a result of generating a virtual viewpoint image with the virtual camera controlled according to the position, attitude, and focal length which are results of the calculation. As shown in FIGS. 7D and 7E, the captured image data on the first output product (the 3D figure model) in FIG. 7D and the second output product (the virtual viewpoint image) in FIG. 7E have the same angle of view.

Note that a method not using the above-described plurality of coordinate markers may be used for the processing of captured image data obtained by image capture of a figure body (a player) zoomed in on using the zooming function of the portable terminal 105.

For example, a position and an attitude for providing a recommended zoom angle of view for a figure body (a player) may be prepared in advance as zoom angle-of-view information on the figure body (player), and the zoom angle-of-view information may be added in the form of a two-dimensional code or watermark information to the figure body (player) which is the first output product. In a case where the captured image data that the image generating apparatus 104 receives from the portable terminal 105 includes zoom angle-of-view information on the figure body (player), a virtual viewpoint image as a second output product may be generated such that the figure body (player) is zoomed in on by control of the virtual camera based on the zoom angle-of-view information. In this case, the captured image data and the second output product generated look like, for example, those in FIGS. 7D and 7E described earlier.

As thus described, the present embodiment can generate and display a second output product such as a virtual viewpoint image having the same angle of view as a captured image obtained by image capture of an output product with, for example, a portable terminal. For example, in a case where a first output product is a 3D model figure, a virtual viewpoint image can be generated as a second output product using the same 3D models used to generate the 3D model figure and the same angle of view as that used in the image capture of the 3D model figure.

For instance, in a case where a first output product is a 3D model figure generated using 3D models in a rugby game, in response to a user capturing an image of the 3D model figure at a desired angle of view using a portable terminal, a virtual viewpoint image (a second output product) at the same angle of view can be played as a video.

In an example where an image of a 3D model figure as a first output product is captured with one player included in the 3D model figure being zoomed in on, a virtual viewpoint image zooming in on that player can be generated as a second output product.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

The present embodiments can generate a virtual viewpoint image of a certain scene corresponding to a modeled product.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-030907, filed Feb. 26, 2021, which is hereby incorporated by reference wherein in its entirety.

What is claimed is:

1. An information processing apparatus comprising:
one or more memories storing instructions; and
one or more processors executing the instructions to:
obtain captured image data by capturing a three-dimensional modeled product of an object corresponding to a scene in a first virtual viewpoint image and information for identifying a specific scene from an image capturing apparatus used to capture the three-dimensional modeled product;

obtain, based on the obtained information, three-dimensional shape data on the object on which the three-dimensional modeled product is based; and generate a second virtual viewpoint image based on the obtained three-dimensional shape data and a camera parameter included in the obtained captured image data and representing a position and an attitude of the image capturing apparatus in a case where the three-dimensional modeled product is captured.

2. The information processing apparatus according to claim 1, wherein
the information is added to the three-dimensional modeled product in a visible form or an invisible form, and obtained by capturing the three-dimensional modeled product.

3. The information processing apparatus according to claim 2, wherein
the information includes information indicating a storage location where the three-dimensional shape data on the object is stored, and
the three-dimensional shape data on the object is obtained by using the information indicating the storage location to access the storage location.

4. The information processing apparatus according to claim 3, wherein
the information further includes a time code corresponding to the specific scene, and
the three-dimensional shape data on the object corresponding to the time code is obtained.

5. The information processing apparatus according to claim 4, wherein
the three-dimensional shape data on the object corresponding to a time code in a predetermined range including the time code corresponding to the specific scene is obtained based on the time code corresponding to the specific scene, and
the generated second virtual viewpoint image corresponds to the time code in the specific range.

6. The information processing apparatus according to claim 5, wherein
the image capture information is specified based on a two-dimensional code or watermark information added to the three-dimensional modeled product.

7. The information processing apparatus according to claim 5, wherein
the image capture information is specified based on an angle-of-view of a capturing device and a region of the three-dimensional modeled product the captured image.

8. The information processing apparatus according to claim 5, wherein
the image capture information includes coordinate information of an object in the captured image.

9. The information processing apparatus according to claim 5, wherein
the image capture information includes angle-of-view information representing an angle-of-view of a capturing device corresponding to the captured image.

10. The information processing apparatus according to claim 1, wherein
the three-dimensional modeled product is the virtual viewpoint image corresponding to a virtual viewpoint different from a virtual viewpoint of the generated second virtual viewpoint image.

11. The information processing apparatus according to claim 1, wherein
the generated second virtual viewpoint image is output to at least one of a sender of the captured image or an external apparatus.

12. An information processing apparatus comprising:
one or more memories storing instructions; and
one or more processors executing the instructions to:
obtain a captured image including a product generated based on a scene in a first virtual viewpoint image, captured image data, and information for identifying a specific scene from an image capturing apparatus used to capture the three-dimensional modeled product;
generate a second virtual viewpoint image based on a camera parameter included in the obtained captured image data and representing a position and an attitude of the image capturing apparatus in a case where the generated product is captured; and
cause a display to display the second virtual viewpoint image of the scene corresponding to the product.

13. An information processing method comprising:
obtaining captured image data by capturing a three-dimensional modeled product of an object corresponding to a scene in a first virtual viewpoint image and information for identifying a specific scene from an image capturing apparatus used to capture the three-dimensional modeled product;
obtaining, based on the obtained information, three-dimensional shape data on the object on which the three-dimensional modeled product is based; and
generating a second virtual viewpoint image based on the obtained three-dimensional shape data and a camera parameter included in the obtained captured image data and representing a position and an attitude of the image capturing apparatus in a case where the three-dimensional modeled product is captured.

14. An information processing method comprising:
obtaining a captured image including a product generated based on a scene in a first virtual viewpoint image, captured image data, and information for identifying a specific scene from an image capturing apparatus used to capture the three-dimensional modeled product;
generating a second virtual viewpoint image based on a camera parameter included in the obtained captured image data and representing a position and an attitude of the image capturing apparatus in a case where the generated product is captured; and
causing a display to display second virtual viewpoint image of the scene corresponding to the product.

15. A non-transitory computer readable storage medium storing a program for causing a computer to perform an information processing method comprising:
obtaining captured image data by capturing a three-dimensional modeled product of an object corresponding to a scene in a first virtual viewpoint image and information for identifying a specific scene from an image capturing apparatus used to capture the three-dimensional modeled product;
obtaining, based on the obtained information, three-dimensional shape data on the object on which the three-dimensional modeled product is based; and
generating a second virtual viewpoint image based on the obtained three-dimensional shape data and a camera parameter included in the obtained captured image data and representing a position and an attitude of the image capturing apparatus in a case where the three-dimensional modeled product is captured.

16. A non-transitory computer readable storage medium storing a program for causing a computer to perform an information processing method comprising:
  obtaining a captured image including a product generated based on a scene in a first virtual viewpoint image, captured image data, and information for identifying a specific scene from an image capturing apparatus used to capture the three-dimensional modeled product;
  generating a second virtual viewpoint image based on a camera parameter included in the obtained captured image data and representing a position and an attitude of the image capturing apparatus in a case where the generated product is captured; and
  causing a display to display the second virtual viewpoint image of the scene corresponding to the product.

* * * * *